(12) United States Patent
Linnenbrink et al.

(10) Patent No.: US 10,137,804 B2
(45) Date of Patent: Nov. 27, 2018

(54) VEHICLE SEAT WITH A RECLINER

(71) Applicant: Johnson Controls GMBH, Burscheid (DE)

(72) Inventors: Jörg Linnenbrink, Wuppertal (DE); Ingo Kienke, Wermelskirchen (DE); Gerhard Rothstein, Velbert (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 235 days.

(21) Appl. No.: 14/394,639

(22) PCT Filed: Apr. 19, 2013

(86) PCT No.: PCT/EP2013/058164
§ 371 (c)(1),
(2) Date: Jan. 6, 2015

(87) PCT Pub. No.: WO2013/156593
PCT Pub. Date: Oct. 24, 2013

(65) Prior Publication Data
US 2016/0297330 A1    Oct. 13, 2016

(30) Foreign Application Priority Data

Apr. 20, 2012 (DE) .................. 10 2012 007 768
Jun. 21, 2012 (DE) .................. 10 2012 012 201

(51) Int. Cl.
*B60N 2/22* (2006.01)
*B60N 2/20* (2006.01)
*B60N 2/90* (2018.01)

(52) U.S. Cl.
CPC ............ *B60N 2/2231* (2013.01); *B60N 2/20* (2013.01); *B60N 2/938* (2018.02)

(58) Field of Classification Search
CPC ......... B60N 2/2231; B60N 2/20; B60N 2/444
USPC ............................................ 297/362, 362.14
See application file for complete search history.

(56) References Cited

U.S. PATENT DOCUMENTS

| | | | | |
|---|---|---|---|---|
| 4,685,735 A | * | 8/1987 | McFalls | B60N 2/2231 297/361.1 |
| 5,172,601 A | * | 12/1992 | Siegrist | B60N 2/233 248/429 |
| 5,248,184 A | | 9/1993 | Morris | |
| 5,435,624 A | | 7/1995 | Bray et al. | |

(Continued)

FOREIGN PATENT DOCUMENTS

| DE | 19502333 A1 | 8/1996 |
|---|---|---|
| DE | 102007013521 A1 | 9/2008 |
| DE | 102007017672 A1 | 10/2008 |

OTHER PUBLICATIONS

German Examination Report for Application No. 102012012201.2 dated May 2, 2016.

(Continued)

*Primary Examiner* — Syed A Islam
(74) *Attorney, Agent, or Firm* — The Dobrusin Law Firm, P.C.

(57) ABSTRACT

The present invention relates to a vehicle seat (1) comprising a seat part (2) and a backrest (3), wherein the backrest (3) is provided in such a way that it is pivotable relative to the seat part (2) by means of a recliner (4). The present invention further relates to an adjusting mechanism.

9 Claims, 6 Drawing Sheets

(56) References Cited

U.S. PATENT DOCUMENTS

Figure 1:
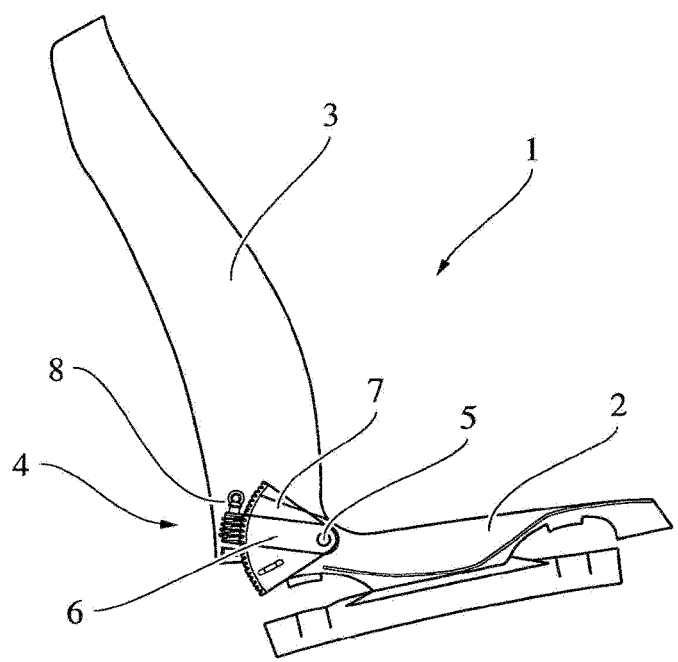

| | | | | | |
|---|---|---|---|---|---|
| 5,997,089 | A | * | 12/1999 | Kawasaki | B60N 2/2231 297/362.12 |
| 7,192,090 | B2 | * | 3/2007 | Sakamoto | B60N 2/433 297/216.1 |
| 7,246,858 | B2 | * | 7/2007 | Hsu | B60N 2/2231 297/361.1 |
| 7,566,099 | B2 | * | 7/2009 | Catanzarite | A47C 1/026 297/361.1 |
| 2008/0164741 | A1 | * | 7/2008 | Sakamoto | B60N 2/2227 297/362 |
| 2009/0021066 | A1 | * | 1/2009 | Nathan | B60N 2/2231 297/362 |
| 2009/0284062 | A1 | * | 11/2009 | Sakai | B60N 2/0232 297/354.1 |

OTHER PUBLICATIONS

International Preliminary Report on Patentability for International Application No. PCT/EP2013/058164 dated Oct. 21, 2014.
Search Report for Application No. PCT/EP2013/058164, dated Aug. 28, 2013.

* cited by examiner

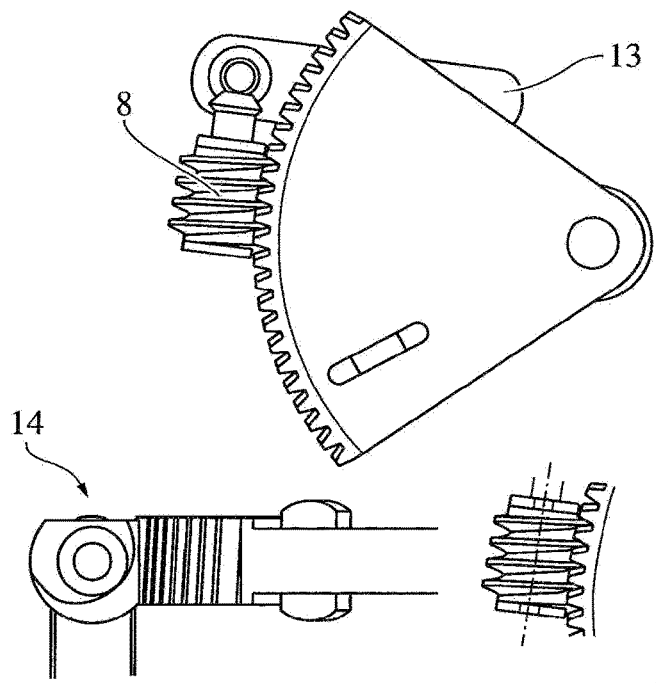
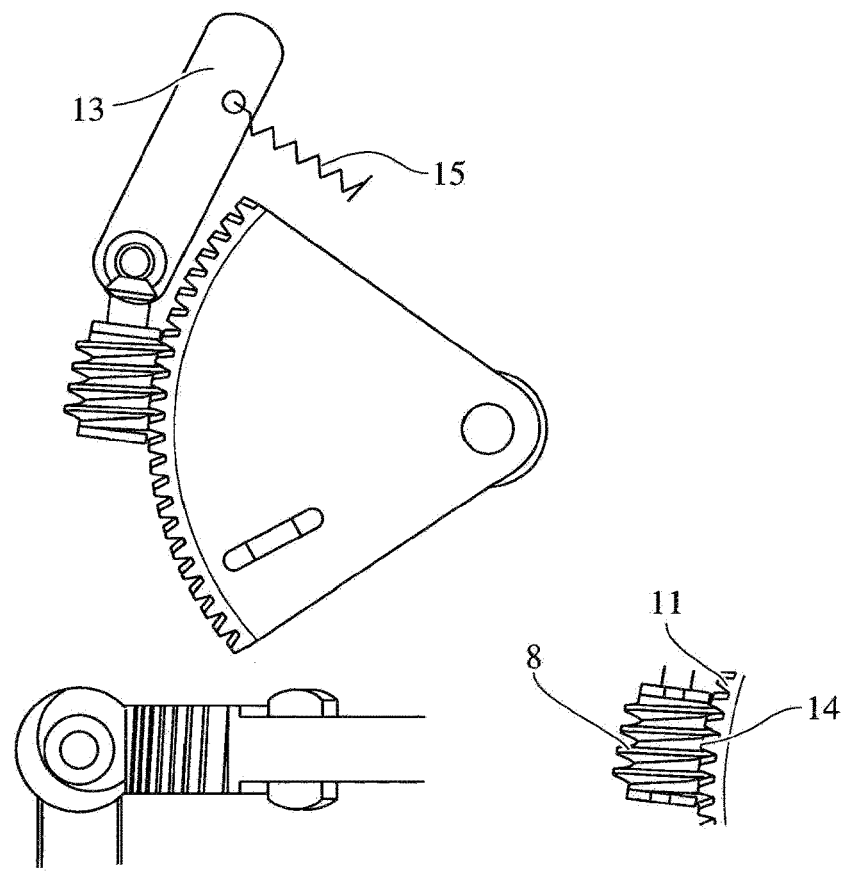
Fig. 3
Fig. 4

VEHICLE SEAT WITH A RECLINER

The present invention relates to a vehicle seat comprising a seat part and a backrest, wherein the backrest is provided to be pivotable relative to the seat part by means of a recliner. The present invention further relates to an adjusting mechanism.

Such vehicle seats are sufficiently well known from the prior art. The backrest in this case is rotated manually or by means of a motor in its position relative to the seat part and blocked in the respectively desired position. The vehicle seats of the prior art, however, have drawbacks, in particular relative to the transmission of force and/or torque from the backrest onto the seat part.

It was, therefore, the object of the present invention to provide a vehicle seat which does not have the drawbacks of the prior art.

The object is achieved by a vehicle seat which has a seat part on which and/or relative to which a backrest is arranged so as to be rotatable about a rotational axis, wherein the backrest is adjusted by means of a recliner and/or is able to be locked in its respective position, preferably on the seat part, wherein the recliner has a positive and/or non-positive connecting means which cooperates positively and/or non-positively with a drive element and/or locking element and the rotational axis of the drive element and/or locking element is provided at an angle to the rotational axis of the backrest.

The disclosure made with reference to this subject of the present invention applies equally to the other subjects of the present invention and vice versa.

The present invention relates to a vehicle seat which has a seat part. This seat part is generally connected to the body of the vehicle, in particular in a longitudinally displaceable manner. A backrest is arranged on the seat part or on the body of the vehicle, said backrest being able to be adjusted in its angle of inclination about a rotational axis which is preferably provided on the seat part or on the body of the vehicle, for example for the purposes of comfort and/or easy entry. In this case, the backrest may be adjusted by means of a recliner and/or locked in the respectively desired position. To this end, the recliner preferably comprises a recliner fitting with a positive and/or non-positive connecting means, in particular a toothing. The recliner fitting may be fixedly or rotatably arranged on the seat part or the body. According to the invention, a drive element and/or locking element is provided on the backrest, said drive element and/or locking element also having a positive and/or non-positive connecting means which, for example, cooperates with the positive and/or non-positive connecting means of the recliner fitting in a positive and/or non-positive manner, in particular so as to mesh therewith, and as a result adjusts the backrest and/or fixes the backrest in the respectively desired position thereof. According to the invention, the drive element and/or locking element is provided to be rotatable, wherein the rotational axis thereof is provided at an angle, in particular at a right angle, to the rotational axis of the backrest, i.e., the rotational axes do not extend in parallel.

According to a further or preferred subject of the present invention, the drive element and/or locking element is a worm gear.

The disclosure made relative to this subject of the present invention applies equally to the other subjects of the present invention and vice versa.

Preferably the worm gear is in engagement with a plurality of positive and/or non-positive connecting means, in particular teeth of a recliner fitting, in particular in order to lock the backrest relative to the seat part.

Preferably the worm gear is provided in one piece with a shaft and/or a further gearwheel.

The following embodiments apply equally to both subjects of the present invention.

The adjustment of the backrest relative to the seat part may take place continuously or discontinuously.

Preferably the worm gear is flattened on one side. This embodiment is advantageous, in particular, for a discontinuous adjustment of the backrest.

Preferably, the drive element and/or locking element is provided to be rotatable on the backrest. In this case, the drive element and/or the locking element may be mounted directly or indirectly on the backrest. For example, the backrest is fixedly connected to one end of a lever arm, the other end thereof being rotatably arranged on the seat part of the body of the vehicle. Preferably, the drive element and/or the locking element is rotatably provided on the lever arm.

Preferably, the recliner comprises a recliner fitting which is particularly preferably configured as a circular sector and which on the outer end thereof further preferably has a positive and/or non-positive connecting means provided to be circular segment-shaped, in particular a toothing. Preferably, the recliner fitting is rotatably arranged on the seat part, wherein the recliner fitting is preferably able to be blocked in specific rotational angular positions on the seat part by a locking means. Preferably, the rotational axis of the recliner fitting is identical to the rotational axis of the backrest.

The drive of the drive element and/or locking element may be implemented by means of a motor and/or manually. Preferably, the drive is provided to be self-locking, so that the backrest is not automatically adjusted. A gear mechanism may be arranged between the drive and the drive element and/or locking element. This gear mechanism may also be designed to be self-locking. Particularly preferably, the gear mechanism is a bevel gear mechanism.

The recliner fitting and/or the drive element and/or locking element may be produced from any material well known to the person skilled in the art. Preferably, metal and/or plastics or any other lightweight material is used as the material. In particular, the worm may be made from plastics, whereby for example the weight and/or the noise generated by the vehicle seat is reduced.

Preferably, all drives, gear mechanisms and/or drive means are provided to be self-locking.

Any drive may be used as a drive means for the worm gear. A belt drive or a gear drive/bevel gear drive may be cited by way of example.

A further subject of the present invention is an adjusting mechanism for adjusting a first element relative to a second element with a worm gear, wherein a partial segment of the worm is flattened and in which the worm has a locking/unlocking mechanism which drives the worm gear in a linear and rotational manner.

The disclosure made relative to this subject of the present invention applies equally to the other subjects and vice versa.

This subject of the present invention relates to an adjusting mechanism, in particular an adjusting mechanism in a motor vehicle, for example in order to adjust the inclination of the backrest relative to the seat part of a vehicle seat and/or in order to adjust a vehicle seat in the longitudinal direction.

The adjusting mechanism has a first element, for example the backrest of a vehicle seat, which is adjusted relative to a second element, for example the seat part of a vehicle seat. A worm gear serves for locking the first part on the second part in the respectively desired relative position. To this end, one element has a toothing with which the worm cooperates. The worm gear is flattened in at least one partial region of its periphery so that in this region the worn is not able to cooperate non-positively and/or positively with the toothing. In this position of the worm gear relative to the toothing, the first part may be adjusted relative to the second part. As soon as the worm gear is rotated such that the worm is in engagement with the toothing, the two parts are locked relative to one another.

According to the invention, the adjusting mechanism thus has a locking/unlocking mechanism which drives the worm gear in a linear and rotational manner.

Preferably, the worm gear has a threaded portion, in particular integrally, with a relatively large pitch, at least with a pitch which is greater than the pitch of the turns of the worm gear. Particularly preferably, an element which is displaceable in a linear manner and which has a corresponding threaded portion is provided on the periphery of this threaded portion.

Preferably, the worm gear is provided so as to be rotatable and longitudinally displaceable on an axle.

Particularly preferably, the worm gear cooperates with a spring means which pretensions the worm gear in one direction. Particularly preferably, the spring means is arranged between the axle and the worm gear and when released effects a linear movement of the worm gear.

Preferably, on a partial segment of its periphery the worm gear has a recess and/or flattened portion in which the flanks of the worm gear are at least partially spaced apart. The geared region of this recess is preferably designed so that an engagement of the remaining flanks in the corresponding gearwheel is facilitated. For example, the cross section of the flanks in the edge region may be bevelled and/or the flanks may be rounded in order to facilitate a driving engagement of the flanks of the worm gear in the corresponding gearwheel.

The invention is described hereinafter with reference to FIGS. 1-8b. These descriptions are merely provided by way of example and do not limit the general inventive idea.

Figure 2:
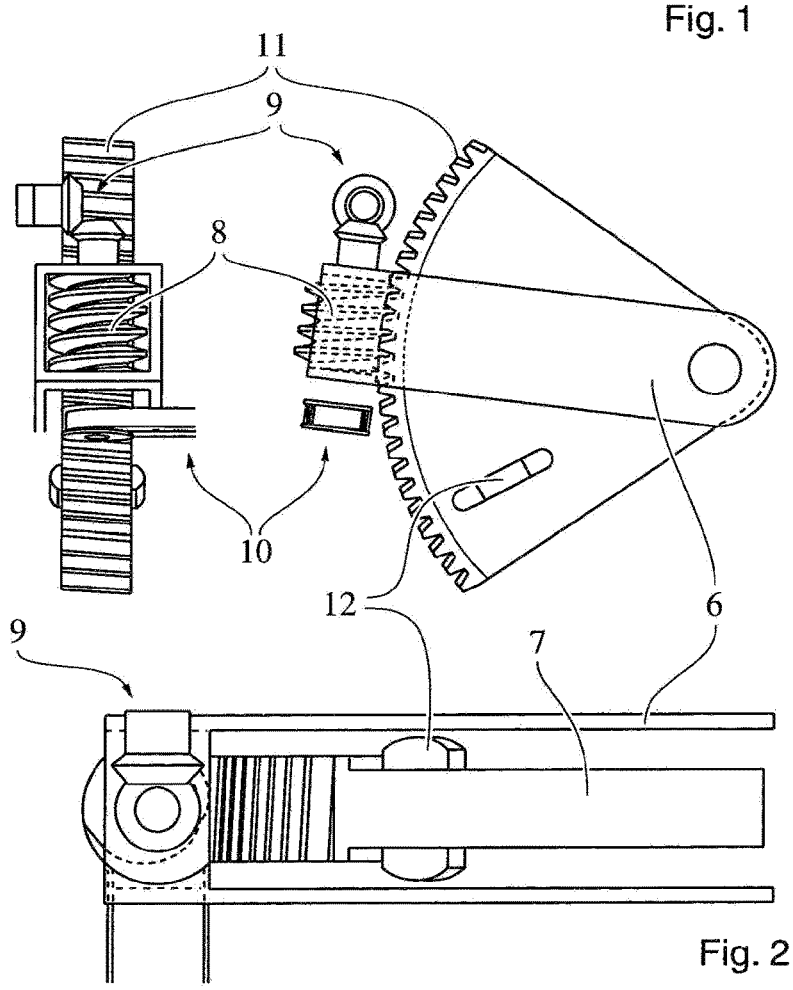
Figure 5:
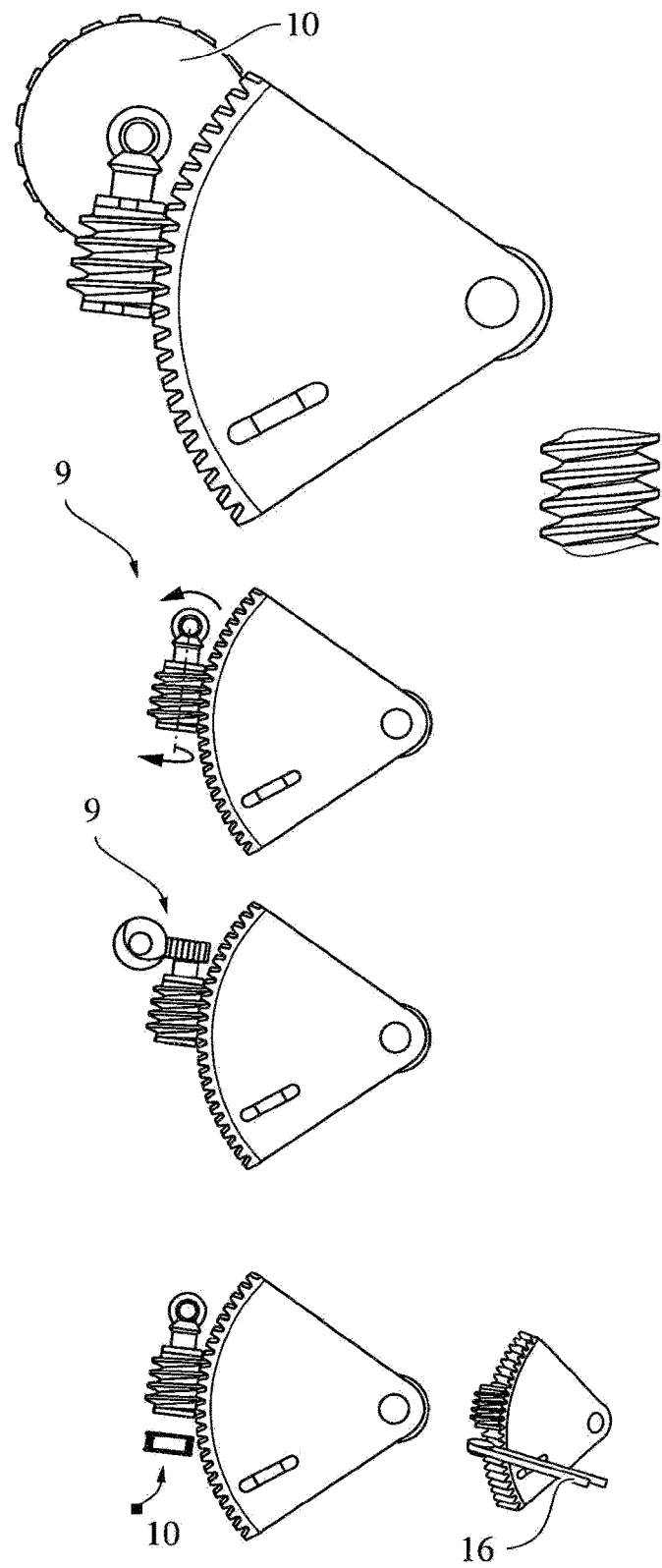
Figure 6A:
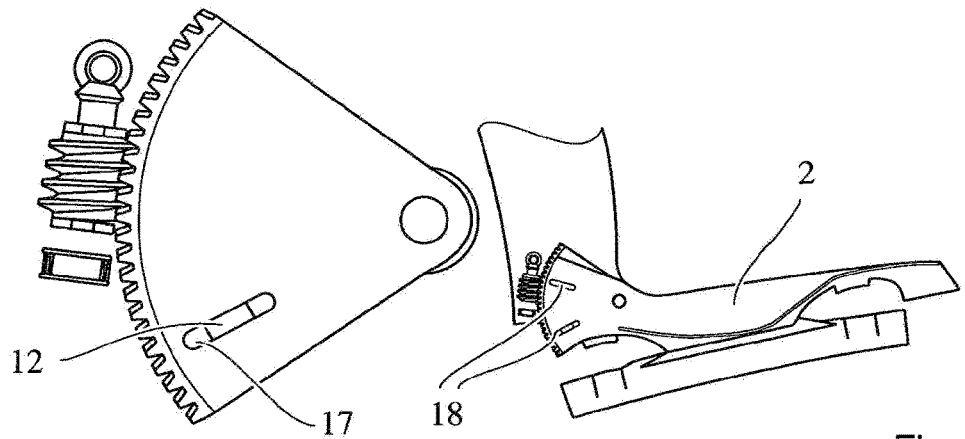
Figure 6B:
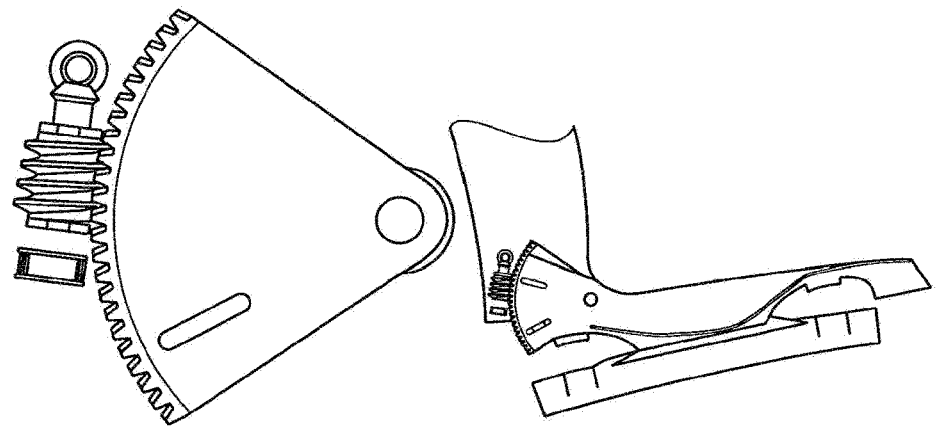
Figure 6C:
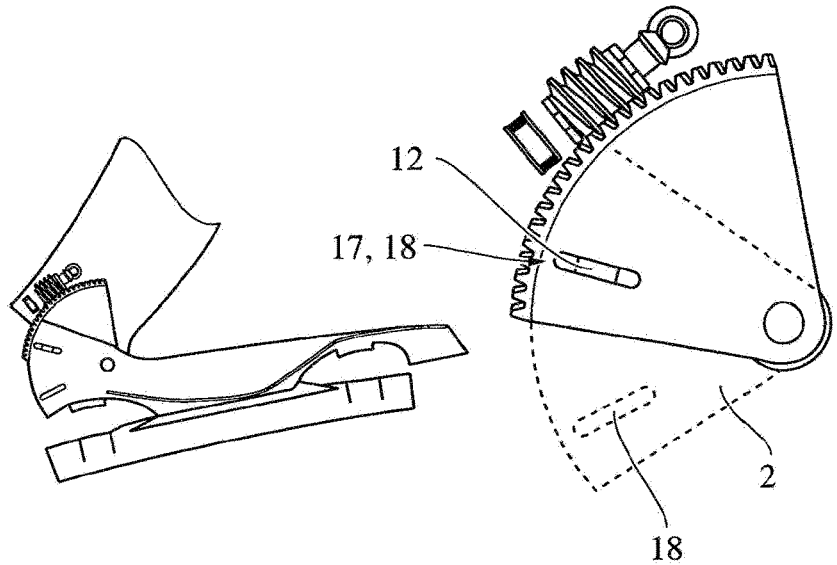
Figure 7:
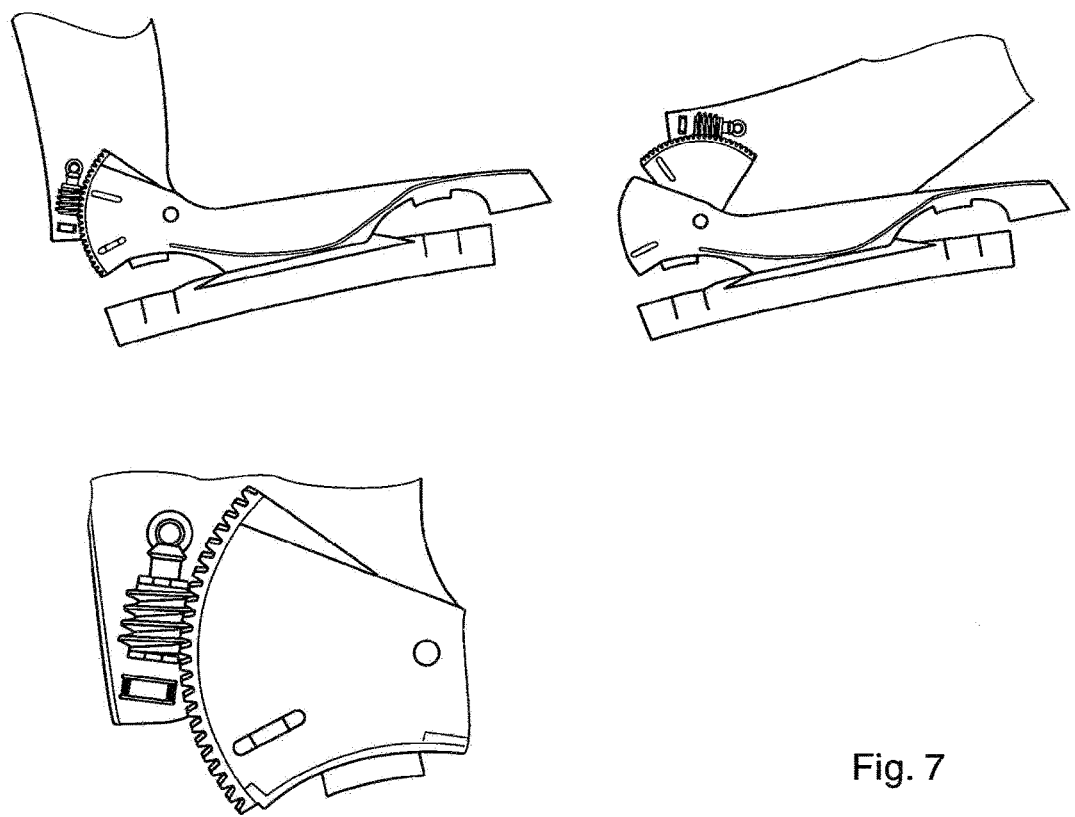
Figure 8A:
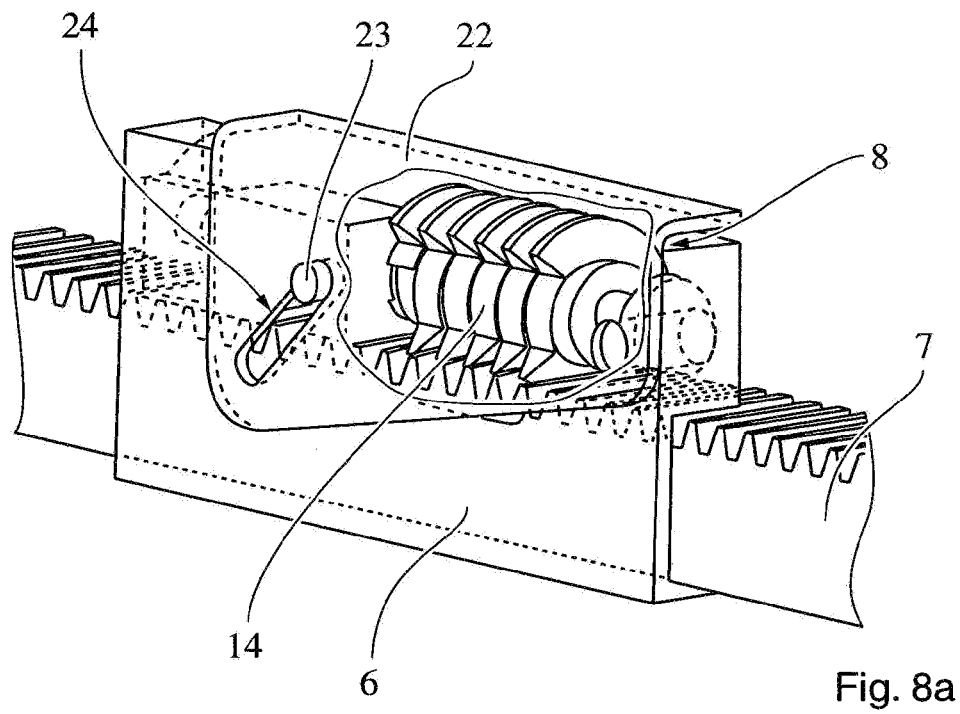

FIG. 1 shows the vehicle seat according to the invention.
FIG. 2 shows details of the recliner.
FIG. 3 shows a locking element for discontinuous adjustment of the backrest.
FIG. 4 shows the drive of the locking element according to FIG. 3.
FIG. 5 shows a drive element and/or locking element for continuous adjustment of the backrest.
FIGS. 6a-c show the easy entry adjustment of the backrest.
FIG. 7 shows the adjustment of the backrest into the stowed position.
FIGS. 8a and b show the adjusting mechanism according to the invention.

FIG. 1 shows the vehicle seat according to the invention which has a seat part 2 which is generally fastened to the body of the vehicle, in particular in a longitudinally displaceable manner. The person skilled in the art, however, understands that the seat part 2 may also be part of the body of the vehicle. The backrest 3 is rotatably arranged about a rotational axis 5 on the seat part 2. The rotational mounting of the backrest takes place by means of a rotary arm 6, one end thereof being provided fixedly in terms of rotation with the backrest and the other end thereof being provided to be rotatable about the rotational axis 5. The backrest 3 may be adjusted for the purposes of comfort and/or easy entry at an angle relative to the seat part and blocked in the respectively desired position. To this end, the vehicle seat according to the invention has a recliner 4 with which the backrest 3 may be adjusted and/or fixed in the respectively desired position. The recliner 4 in the present case consists of a recliner fitting 7, in particular a recliner sector, which in the present case is provided so as to be movable relative to the seat part, in particular rotatable about the rotational axis 5. The recliner fitting 7 has on its outer periphery a positive and/or non-positive connecting means 11, in the present case a toothing 11. A drive element and/or locking element 8 complementary to the positive and/or non-positive connecting means 11 is rotatably provided on the backrest, in particular on the rotary arm 6, said drive element and/or locking element cooperating with the positive and/or non-positive connecting means 11 in a positive and/or non-positive manner. As a result, the backrest may be adjusted in its angular position relative to the seat part and/or fixed in the respective position. Preferably, the drive element and/or the locking element 8 is a worm gear. According to the invention, the rotational axis of the drive element and/or locking element 8 is provided at a right angle to the rotational axis 5 of the backrest.

FIG. 2 shows details of the recliner 4. The drive element and/or locking element 8, in the present case a worm gear, is connected to a gear mechanism 9, in the present case a bevel gear mechanism, and as a result is rotatably driven. As an alternative drive, a belt drive 10 which also drives the worm gear in a rotational manner is also shown. During the rotation thereof, the worm gear 8 meshes with the toothing 11 of the recliner fitting and, as a result, moves along the outer periphery of the recliner fitting and at the same time drives the lever arm 6 and, as a result, the backrest so that said backrest is altered in its angle relative to the seat part. The adjustment of the backrest shown here is a so-called continuous adjustment. If the drive element and/or locking element 8 does not rotate, it fixes the backrest in its respective position relative to the recliner fitting 7. Preferably, the worm gear 8, the bevel gear and the shaft connecting said worm gear and bevel gear are provided in one piece.

An embodiment of the recliner of the vehicle seat according to the invention which permits a discontinuous adjustment of the backrest is shown in FIG. 3. In the present case, the locking element 8 is provided with a flattened portion 14. The rotation of the locking element 8 is implemented in the present case by means of a lever 13, the rotational movement thereof being forwarded to the locking element 8, in this case via a bevel gear mechanism. By means of the lever 13, the locking element 8, in the present case once again a worm gear, is rotated from its locked position in which the non-positive and/or positive connecting means of the locking element 8 is in engagement with the toothing 11 of the recliner fitting, into an unlocked position in which the flattened portion 14 opposes the toothing 11 and vice versa.

FIG. 4 shows the recliner in its unlocked position. The lever 13 has been rotated counterclockwise, whereby the locking element 8 has also been rotated sufficiently far that it is no longer in engagement with the toothing 11 of the recliner fitting. As a result, the backrest may be adjusted, for example manually, into the respectively desired position. As soon as this position is reached, the seat occupant releases the lever 13, whereby said lever is rotated clockwise by the pretensioning of the spring 15. This rotation is in turn transmitted to the locking element 8, whereby the positive and/or non-positive connecting means thereof comes into engagement again with the toothing 11 and thus fixes the backrest in the desired position. The person skilled in the art understands that the rotary drive of the locking element 8 may also be implemented by any other drive.

A recliner for a continuous adjustment of the backrest is shown in FIG. 5. In the present case, the vehicle seat according to the invention has a drive 10, in this case a handwheel 10, the rotational movement thereof being transmitted by means of a gear mechanism, in this case a bevel gear mechanism, to the drive element and/or locking element 8. During this rotation, the drive element and/or locking element 8 meshes with the toothing 11 of the recliner fitting and as a result moves along the outer periphery of the recliner fitting and at the same time drives the backrest. Different shapes of drive, which in each case permit a continuous adjustment of the backrest, are shown in the lower part of FIG. 5. The view furthest to the left is a bevel gear drive. In the central view a worm gear drive is shown. In the embodiment according to the right-hand view, the drive element and locking element 8 is driven by a belt 16. The respectively required torque may be provided manually or by means of a motor.

The adjustment of the backrest from the position of use into the easy entry position is shown in FIGS. 6a to 6c. Proceeding from the position of use (FIG. 6a) the recliner fitting 7 is locked to the seat part 2. To this end, a locking element 12 which in the present case is arranged in a recess 17 in the recliner fitting 7 is provided on the recliner fitting 7. For the locking procedure, this locking element 12 engages in a recess 18 in the side part 2.

If the backrest is now to be transferred into its easy entry position, the locking element 12 is unlocked, i.e. moved out of the recess 18, so that the recliner fitting 7 may rotate freely relative to the seat part 2 about the rotational axis 5 (see FIG. 6b).

The easy entry position is shown in FIG. 6c. As soon as the backrest has reached this position, the locking element 12 again engages in a recess 18 in the side part 2 and, as a result, locks the backrest in the easy entry position.

A transfer of the backrest into the so-called stowed position is shown in FIG. 7. Proceeding from the easy entry position, the locking element 12 is unlocked again and the backrest is rotated again clockwise, until it has reached the stowed position.

The person skilled in the art understands that the worm gear and the corresponding toothing may also be decoupled by a relative movement between the worm gear and gearwheel. For example, the worm gear may be rotated relative to the toothing and/or moved in a linear manner. The movement may take place in this case in a perpendicular direction away from the toothing and/or parallel to the toothing.

Figure 8B:
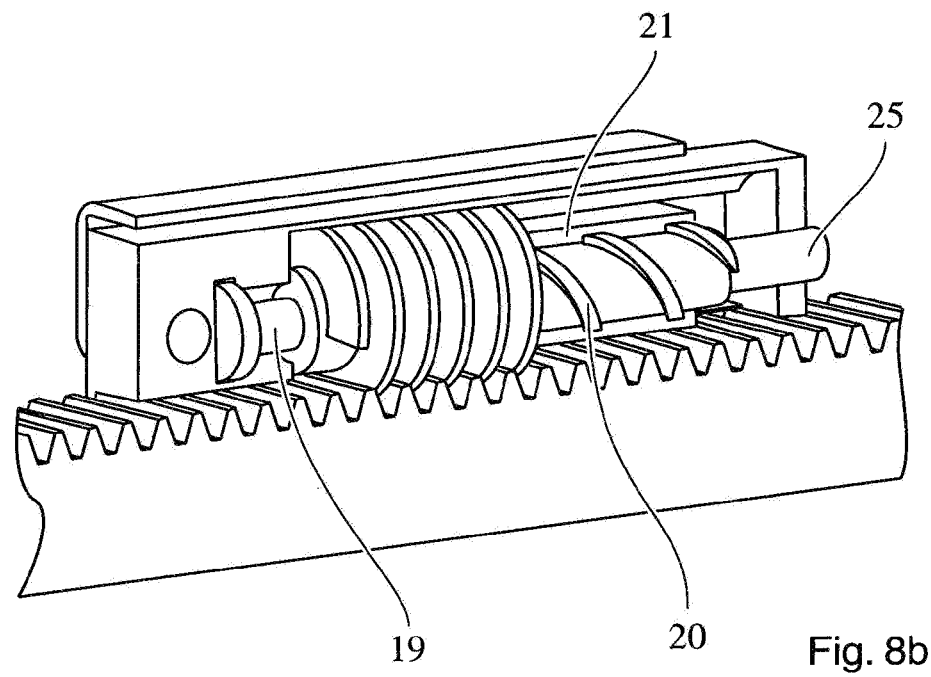

FIGS. 8a and 8b show the adjustment mechanism according to the invention. The adjustment mechanism has a first element 6, for example the backrest of a vehicle seat, which is adjusted relative to a second element 7, for example the seat part of a vehicle seat. A worm gear 8 serves for locking the first part 6 to the second part 7 in the respectively desired relative position. To this end, one element 7 has a toothing with which the worm cooperates 8 in a locking manner. The worm gear 8 is flattened and/or recessed at least in a partial region 14 of its periphery such that in this region the worm 8 is not able to cooperate non-positively and/or positively with the toothing of the element 7. In this position of the worm gear relative to the toothing, the first part 6 may be adjusted relative to the second part 7. As soon as the worm gear is rotated such that the worm comes into engagement with the toothing, the two parts are locked relative to one another. The worm 8 is mounted rotatably and longitudinally displaceably on an axle 25. Preferably, the adjustment mechanism according to the invention has a region 19 in which a spring means (not shown) is provided, said spring means being compressed and/or released during a longitudinal movement of the worm gear. Preferably at least one edge region, preferably both edge regions, of the flattened portion/recess is/are designed such that the re-engagement of the flanks of the worm gear in the corresponding toothing, in this case by rotating the worm gear, is facilitated.

FIGS. 8a and 8b show the worm gear 8 in each case in its looked state. For the unlocking procedure, in this case a lever 22 is rotated counterclockwise. This lever 22 has a slot 23 in which a pin or a projection 23, which is connected to a nut 21, engages. By rotating the lever 22, the nut is moved in a linear manner in FIG. 8a to the right. The lever may be driven manually or by means of a motor. The nut has a recess which is provided with an internal thread with a large pitch. This internal thread, cooperates with a screw 20 which is preferably connected integrally to the worm gear 8. The linear movement of the nut 21 rotates the screw 20 and thus the worm gear 8 for a sufficient length of time until the turns of the worm 8 are no longer in engagement with the toothing of the second part 7. Subsequently, the worm 8 is preferably pushed against the force of a spring means in the direction of a stop. The nut 21 holds the worm 8 in this position. The adjusting mechanism is now unlocked and the first element 6 may be moved relative to the second element 7.

As soon as the desired relative position of the two elements 6, 7 has been reached, the two elements have to be locked again relative to one another. To this end, the lever 22 is moved again into the position shown in FIGS. 8a, b. As a result, the nut 21 is moved in a linear manner and at the same time drives the worm gear 8 and causes it to rotate. As soon as the turns of the worm gear, however, bear against the teeth of the second element 7, such a rotation is not possible and the worm gear is only moved in a linear manner along the second element. As soon as the turns of the worm 8 overlap the gaps between the teeth of the element 7, the worm gear begins to rotate and the flanks of the worm gear engage between the teeth of the second element 8 and the two elements 6, 7 are locked relative to one another. The movement of the worm gear is preferably assisted by a spring means. The lever may be pretensioned in the position in which the worm gear engages in the corresponding position in a locking manner. The locking and/or unlocking may also foe implemented by means of a motor or manually with the same construction. As a result, the required number of parts is reduced.

LIST OF REFERENCE NUMERALS

1 Vehicle seat
2 Seat part
3 Backrest
4 Adjustment mechanism, recliner
5 Pivot point, rotational axis
6 First element, rotary arm
7 Second part, fixed part, recliner fitting, recliner sector
8 Drive element, locking element, worm gear, worm gear drive
9 Gear mechanism
10 Drive, handwheel, motor
11 Positive and/or non-positive connecting means, teeth
12 Easy entry locking system
13 Drive, lever
14 Flattened portion 15 Pretensioning means
16 Belt, toothed belt
17 Recess, slot in recliner fitting 7
18 Recess, slot in seat part 2
19 Region of a spring means
20 Screw having a large pitch
21 Hut
22 Lever
23 Pin
24 Slot
25 Axle

The invention claimed is:

1. A vehicle seat comprising a seat part relative to which a backrest is arranged so as to be rotatable about a backrest rotational axis;
   wherein the backrest is adjusted by means of a recliner and is able to be locked in a respective position on the seat part;
   wherein the recliner comprises a recliner fitting with a positive and/or non-positive connecting means in form of a toothing, which cooperates positively and/or non-positively with a drive element and/or locking element;
   wherein the drive element and/or locking element is connected rotatably to the backrest;
   wherein a drive element and/or locking element rotational axis is disposed at an angle to the backrest rotational axis;
   wherein the vehicle seat further comprises a drive, of which a rotational movement is transmittable to the drive element and/or locking element by means of a bevel gear mechanism; and
   wherein the drive element and/or locking element is a worm and is configured to mesh with the toothing of the recliner fitting during this rotation, and as a result, the drive element and/or locking element moves along an outer periphery of the recliner fitting to drive the backrest; and
   wherein the worm is flattened and/or recessed at least in a partial region of its periphery such that in this region the worm is not able to cooperate non-positively and/or positively with the toothing of the recliner fitting so the backrest may be adjusted relative to the recliner fitting;
   wherein the worm is mounted rotatably and longitudinally displaceable on an axle; and
   wherein the vehicle seat further comprises a spring means, said spring means being compressed or released during a longitudinal movement of the worm.

2. The vehicle seat of claim 1, wherein the drive element and/or locking element comprises a worm gear.

3. The vehicle seat of claim 1, wherein the recliner fitting is configured as a circular sector.

4. The vehicle seat of claim 3, wherein the recliner fitting is rotatably mounted on the seat part.

5. The vehicle seat of claim 4, wherein the recliner fitting has a recliner fitting rotational axis, and wherein the recliner fitting rotational axis and the backrest rotational axis are identical.

6. The vehicle seat of claim 4, further comprising a locking system which locks the recliner fitting fixedly in terms of rotation to the seat part.

7. The vehicle seat of claim 1, wherein the drive element and/or locking element rotational axis is provided at a right angle to the backrest rotational axis.

8. The vehicle seat of claim 1, wherein the adjustment of the backrest takes place continuously.

9. The vehicle seat of claim 1, wherein the adjustment of the backrest takes place discontinuously.

* * * * *